United States Patent [19]

Neary

[11] Patent Number: 4,545,207
[45] Date of Patent: * Oct. 8, 1985

[54] SOLAR ENERGY SYSTEM

[76] Inventor: Michael P. Neary, 409 E. Coronado #2, Santa Fe, N. Mex. 87501

[*] Notice: The portion of the term of this patent subsequent to Jan. 10, 2001 has been disclaimed.

[21] Appl. No.: 271,860

[22] Filed: Jun. 9, 1981

Related U.S. Application Data

[63] Continuation of Ser. No. 74,423, Sep. 11, 1979, abandoned, and a continuation-in-part of Ser. No. 136,496, Apr. 3, 1980, Pat. No. 4,424,805, which is a continuation of Ser. No. 894,826, Apr. 10, 1978, abandoned.

[51] Int. Cl.$^4$ .......................... F01K 25/08; F03G 7/02
[52] U.S. Cl. ........................................ 60/645; 60/673; 60/641.8; 60/649; 165/104.12
[58] Field of Search ...................... 165/104.12; 60/643, 60/645, 673, 649, 641.8

[56] References Cited

U.S. PATENT DOCUMENTS 4,424,805 1/1984 Neary ................................. 126/452

Primary Examiner—Allen M. Ostrager

[57] ABSTRACT

This invention relates to a solar energy system wherein chemical A is converted into chemical B in the presence of a photo-sensitizer with the absorption of considerable heat, which heat can be redelivered at will by placing chemical B in contact with a catalyst. The catalyst is stable at high temperatures permitting operation through the phase change from liquid to vapor with consequent use of chemical B for performing work in engines, heat pumps and the like.

2 Claims, 3 Drawing Figures

SOLAR ENERGY SYSTEM

This application is a continuation of Ser. No. 06/074,423, filed 9/11/79 now abandoned, and a continuation-in-part of Ser. No. 06/136,496, filed 4/03/80 now U.S. Pat. No. 4,424,805, which application was a continuation of Ser. No. 05/894,826, filed 4/10/78 now abandoned.

This invention relates to a novel solar energy system.

The world's need for efficient utilization of as yet unused energy sources grows daily. Virtually all of the energy sources presently being used are either non-renewable (i.e., fossil fuels) or present substantial risk to the environment (i.e., nuclear fuels). Other energy sources not yet in substantial use include wind and solar energy. Solar energy is distinct from all others in that it is limitless and in constant supply.

Until recently, the feature that distinguished fossil and nuclear energy from solar energy was the physical and chemical stability of fossil and nuclear fuels and the absence of a solar fuel. It is noted that the term "fuel" means the stored form of energy and, as such, provides the physical-chemical means of storage and controlled utilization.

A good fuel of any type should be inexpensive, easily handled, non-toxic, and high in energy content. An ideal fuel, in addition to the above, would be recyclable.

The prior art discloses many solar energy systems based on water or other aqueous fuel media, and also some eutectic salt systems. All of these require heating by the sun to raise the fuel above ambient temperatures and it is necessary to maintain such raised temperatures by costly and inefficient insulating means until the energy is finally used as in residence heating or the like.

U.S. Pat. Nos. 4,004,571, 4,004,572 and 4,004,573, all issued Jan. 25, 1977, and assigned to Battelle Corp., disclose solar energy systems using mixtures of water and certain isomerizable materials, but acknowledge difficulties in operating, including the necessity to actually suppy heat to induce reverse isomerization, conflicting reactions in the system as the temperature rises, thus limiting conversion efficiency and storability, and the necessity for separate storage of products, as well as other problems. Moreover, none of these references identify:

(1) NBD-Q as both a fuel and thermodynamic working substance;
(2) the means by which the liquid mixture NBD-Q can be caused to convert to the gas phase without the application of an external heat source;
(3) the means of performing useful work with a solar derived photochemical.

A typical prior art disclosure is found in Solar Energy, Volume 19, pages 503 to 508, Pergaman Press (printed in Great Britain) entitled "The Use of Functionalized Polymers as Photosensitizers in an Energy Storage Reaction" by Hautala et al. This publication, like others in the literature, fails to disclose a complete system for solar energy storage and does not disclose sufficient details for an operable system for this purpose.

The principle object of the present invention is a new and improved solar energy storage and retrieval system from which useful work can be extracted in a practical manner.

A further object is a solar energy system based on a photochemical process which can achieve a liquid to gas phase change and temperatures of up to 140° C. over the starting temperature of the liquid photochemical (at the time of energy release.

A further object is a photochemically based solar energy system wherein the high energy photochemical acts as both a fuel and thermodynamic working substance.

Other objectives will be appreciated from the further detailed description of the invention.

Accordingly, the present invention relates to a solar energy system wherein Chemical A is converted into chemical B in the presence of a specific selected sensitizer with the absorption of considerable solar energy, which heat can be redelivered at will by placing chemical B in contact with a particular selected catalyst, where the liquid product chemical B, neat (without water or other diluent) or mixed with liquid chemical A, can be caused to convert to the gas phase.

In its preferred form this invention system involves a photoisomerization reaction. Chemical A is selected from chemicals which can be made to isomerize by sunlight to form chemical B as an isomer while absorbing solar heat in substantial quantities. Preferably a particular photosensitizer is present to enhance the isomerization when the light source is the sun.

While many different isomers can be used, I greatly prefer to use the system in which norbornadiene (NBD) is converted into its isomer quadricyclene (Q).

The liquid NBD is exposed to sunlight in the presence of a particular photosensitizer. Any suitable solar collector can be used.

While many photosensitizers may be used, it is greatly preferred that the sensitizers' electronic absorption spectrum shall overlap both the electronic absorption spectrum of NBD and the sun's emission spectrum. When this is the case, the photosensitizer absorbs the sun's radiation and transfers the absorbed energy to the NBD which immediately isomerizes to the liquid Q. Thus the benefits of the photosensitizer can be appreciated. A preferred photosensitizer is 4-(N,N-dimethylamino)benzophenone.

It is greatly preferred to use the NBD neat, that is, without water or other diluent. Q gives up its energy in the presence of a catalyst as desired. One preferred catalyst for this purpose is a cobalt (II) porphyrin.

Substantial additions are obtained by immobilizing both the photosensitizers and the catalysts in their respective zones. One preferred way of accomplishing this is by chemical attachment of the photosensitizers or the catalysts to particular separate insoluble silanized matrices, such as controlled pore glass beads, alumina, etc. Thus beads or chips of the silanized glass photosensitizer or the silanized catalyst can then be disposed and retained in the photosensitizer zone and in the catalyst-heating regenerating zone respectively.

Referring generally to the figures of the drawing.

The invention may be more readily understood by referring to Example 1.

EXAMPLE 1

Figure 1:
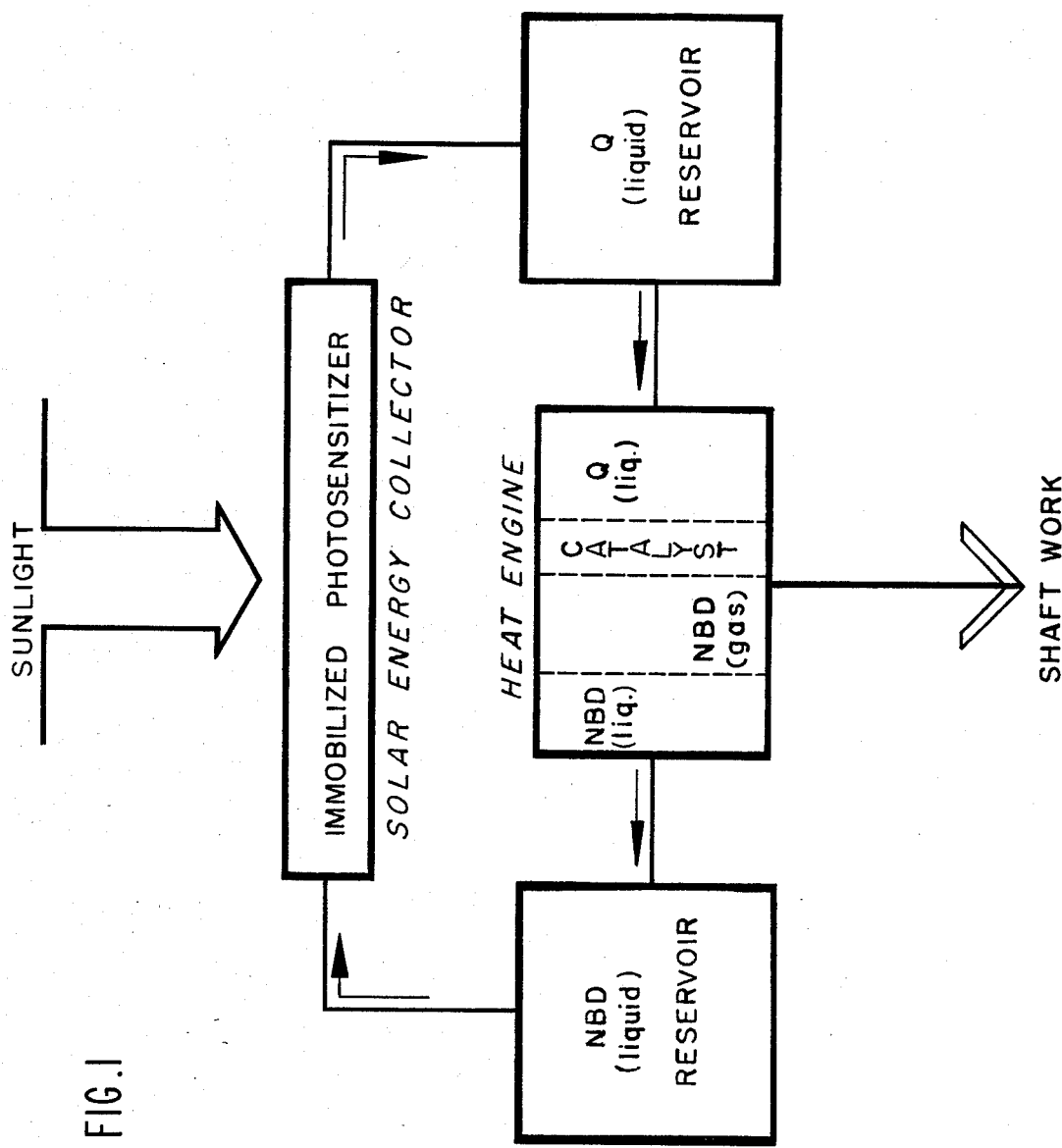
FIG. 1 is a schematic view of the solar energy storage and retrieval system according to the invention.

Referring to FIG. 1, the solar energy collector was charged with three hundred grams of glass beads on which photosensitizer is immobilized chemically. Sunlight was admitted to the collector for a period of time, upon which circulation of the liquid NBD was started clockwise in the conduits as shown by the arrows and the resulting liquid containing the isomer Q which had been formed was delivered to the storage chamber. When work was to be performed, the liquid Q was released from storage through the conduit to the heat engine where an immobilized catalyst on silanized glass beads, namely, controlled pore glass beads, containing a cobalt (II) porphyrin in the amount of several grams was located. Upon contacting the catalyst, the chemical Q was reisomerized to NBD and heat was given off in the order of magnitude of 260 calories per gram of Q causing vaporization of the liquid due to up to a 140° C. increase in temperature. The vapor was directed on to a turbine rotor causing rotation and therefore shaft work. The remaining liquid containing NBD thus regenerated passed through the exit conduit of the heat engine along the counterclockwise arrows and returned to the solar energy collector. At this point the cycle was complete.

This type of photoisomerization of NBD to Q possesses a number of attractive features as listed below:

1. NBD is readily available and comparatively inexpensive.
2. Q has a very high energy storage capacity, approximately 3.5 million Joules per gallon or 830,000 calories per gallon (260 calories per gram); three to four times greater than water-based systems.
3. Both NBD and Q are liquids. Q is chemically stable at ambient temperatures but with an appropriate catalyst can be readily reconverted to NBD with release of the stored energy heat, to the extent that: a 140° C. increase in temperature can occur and a phase change of the liquid to a gaseous state.
4. Conditions exist for which both photochemical formulation of Q and catalytic reversion of NBD can be made virtually quantitative.
5. Solar energy may be stored indefinitely, since reversion of Q to NBD is negligibly slow at room temperature in the absence of a catalyst.

A practical working device based on the NBD-Q system requires a readily available, high efficiency photosensitizer and catalyst as well as knowledge of the conditions that will allow long-term recyclability of the system. Furthermore, the photosensitizer and catalyst are desirably physically confined to their respective chambers in a working device.

It will be appreciated that many modifications may be made in the foregoing concepts without departing from the scope of this invention, including, for instance, various additional sensitizers, catalysts, and photoisomerization systems, equipment configuration and others. Furthermore, the invention is intended to include the following:

1. Since the conversion of quadricyclene to norbornadiene can result in a phase change (liquid to vapor) of the mixture, any use of this property is included within the scope, such as direct or indirect drive of turbines, pumps, and any other machine for whatever purpose; and
2. The application of the system as either an auxiliary heat source or as a sole source of heat for the operation of engines by heat directly or indirectly as in refrigeration systems, turbines, and the like.

Because of the efficiency and stability of our catalyst (to be described in detail below) it is possible to elevate the temperature of the photochemical fluid to high temperatures, for instance 140° C. over the temperature of the fluid which is a temperature in excess of that needed to cause a liquid to gas phase change. By application of this characteristic to a heat engine, and/or a Carnot engine and/or a heat pump useful work can be performed.

In its preferred form, this invention relates to the discovery that NBD-Q can be used as a thermodynamic working substance and fuel. To appreciate the nature and extent of the invention it is necessary to present a well accepted definition of: (1) a thermodynamic working substance, and (2) a fuel. Further, it is necessary to appreciate that our method for converting Q to NBD results in a large temperature change with an accompanying phase change (liquid to gas) forms the basis for the invention under discussion. Furthermore, before my invention of means of converting Q to NBD, no one would have considered Q/NBD as a thermodynamic working substance and/or a fuel by any practical definition of the terms; because of the efficiency and stability of our patent immobiled catalyst. It is possible to elevate the temperature of the photochemical fluid to high temperatures during Q to NBD conversion for instance by 140° C. which results in a temperature well in excess of that needed to cause a liquid to gas phase change. By application of this characteristic to a heat engine, and/or a Carnot engine and/or a heat pump useful work can be performed, thus the photochemical fluid acts as: (1) a thermodynamic working substance, and (2) a fuel.

A thermodynamic working substance can be defined as any material that can act as a heat reservoir from which work can be extracted by a heat engine and that is not consumed or appreciably chemically altered by either being heated, carrying heat or having its heat extracted by the heat engine.

A fuel is defined as a substance that possesses chemical energy in a metastable form that can be conveyed to heat on demand. The details of the definitions are further illustrated below.

THE INTERCONVERSION OF HEAT AND MECHANICAL ENERGY

A motor can be defined as a device for obtaining mechanical energy from some other form of energy. A motor which converts heat energy into mechanical energy is known as a heat engine. Examples of heat engines include: the conventional piston steam engine, the Diesel engine, two-cycle and 4-cycle gasoline motors, jet motors, rockets and steam and gas turbines. In all of these, heat energy is usually obtained from the chemical energy contained in some fuel. (Some examples of motors which are not heat engines include: electric motors, water wheels, hydraulic turbines, falling weights-spring driven devices and wind mills). It has not yet been possible to devise any other economical, large scale method for transforming chemical energy into mechanical energy that does not involve a preliminary transformation of chemical energy into heat or thermal energy.

A heat pump is a contrivance which, in doing mechanical work, removes heat energy from a body at a low temperature and injects it into another body at a higher temperature. Examples of heat pumps are mechanical refrigerators, air conditioners and certain types of heating units.

An important property of all motors and pumps is that as they convert one form of energy into another they must themselves repeatedly pass through a closed cycle of states where a state of the system is defined by $$e = \frac{\text{heat removed from cold reservoir}}{\text{work needed to operate pump}} = \frac{q_c}{W} = \frac{T_c}{T_h - T_c}$$

If the heat pump is being used to heat some object, the efficiency can be measured as the ratio $$e = \frac{\text{heat expelled to hot reservoir}}{\text{work needed to operate pump}} = \frac{q_h}{W} = \frac{T_h}{T_h - T_c}$$

It can also be shown that these expressions give the upper limits to the efficiencies of any heat pump and are not limited to the ideal gas heat engine used as a heat pump. The same is true of the efficiency of the ideal gas heat engine described above.

The operation of a heat engine in which the thermodynamic working substance is an ideal gas has been discussed in some detail above. Certain properties of this heat engine are, however, independent of the working substance employed in the engine and would be found if other substances were used such as water above its boiling point or NBD/Q above its boiling point. An idealized heat engine shall now be considered, where the thermodynamic working fluid can be any substance, not necessarily an ideal gas. This engine is known as a Carnot engine and operates on the following cycle:

Step 1. Reversible isothermal expansion of the working substance at temperature $T_h$, in which heat $q_h$ is absorbed from a hot reservoir also at $T_h$, Step 2. Reversible adiabatic expansion in which the temperature of the working substance is caused to drop from $T_h$ to $T_c$ without any heat being absorbed, Step 3. Reversible isothermal compression of the working substance at temperature $T_c$ in which heat $-q_c$ is expelled to a thermal reservoir at $T_c$ (not that in general $q_c$ will be a negative quantity), and Step 4. Reversible adiabatic compression of the working substance in which the engine is returned to its state at the beginning of step 1 with a return to temperature $T_h$ and no heat exchanged with the surroundings.

As was the case for the ideal gas heat engine described above $\Delta E_{overall}$ was zero since the engine ends up in exactly the same state at which it began, however, $\Delta E_1$ and $\Delta E_2$ may not be zero. Because $\Delta E_{overall}$ is zero, the net work (W) is equal to the net heat change $(q_h + Q_c)$ by the first law of thermodynamics. It is noted that in the Carnot cycle all of the steps were reversible. It is this feature that makes the Carnot engine an idealized concept unattainable in practice. However, the theoretical discussion serves to define the real processes occurring for the purpose of illustration and to define the upper limit of performance. Thus the Carnot engine is the accepted basis for comparison as well as of understanding a practical system.

As mentioned before, by means of our patented catalyst which is an immobilized cobalt porphorin, very high temperature increases (for example 140° C.) can accompany the conversion of quadricyclene (Q) to norbornadiene (NBD). Temperatures of this magnitude of the NBD produced by the conversion of Q will cause a liquid-to-gas phase change, a fact only realized by the work upon which this patent application depends, and if this reaction occurs in a closed vessel superheating can occur (due to the difference in the heat capacities of the liquid and gas phases) giving rise to even higher temperatures, several hundred degrees for example. This feature of the NBD-Q system makes it possible to use solar radiation stored in Q to provide the energy to drive a heat engine and/or heat pump in a new and unique manner!

In particular seven of the possible heat engine configurations or applications are considered, Example 1, above, where NBD-Q is the thermodynamic working substance in a generalized heat engine, Example 2, where NBD-Q is the thermodynamic working substance and the fuel for a heat engine of the piston type, and Example 3, where the heat categorically released from Q is used to heat a separate and different thermodynamic working substance. Example 4 is one in which the catalytic conversion of Q to NBD and the accompanying liquid-to-gas phase change is used to drive a turbine, and is thus both the thermodynamic working substance and the fuel, Example 5, where NBD-Q is the thermodynamic working substance—fuel and refrigerant in a heat pump (i.e., refrigerator), Example 6 where NBD-Q is a heat source or fuel for another thermodynamic working substance, a common refrigerant, used in a mixture, and Example 7, where NBD-Q is a heat source or fuel for another thermodynamic working substance, a common refrigerant, separated by a barrier (i.e., not mixed).

These comments are not meant to eliminate other configurations or applications; the performance of useful work by the cyclical motion of a piston in a cylinder is used as an example.

In order to aid in understanding the proposed use, the normal operating cycle of a simple steam engine (which is a heat engine) is described. A simple steam engine requires, in general, a cylinder with movable piston, a fuel supply, a burner, a boiler, a working substance (such as water), a condenser and miscellaneous hardware such as valving and fluid conductors and the like. Fuel supplied to the burner is the source of energy which is converted into mechanical energy and/or useful work. The thermodynamic working substance, water for example, is placed in the boiler where it is heated to a high temperature and undergoes a phase change from liquid water to gaseous water (steam). When the piston-cylinder relationship is such that a relative minimum volume exists above the piston the superheated (high pressure) steam is allowed to enter the cylinder and expand by driving the piston to a position such that a maximum or near maximum volume exists above the piston. At this time the cylinder is vented to the condenser where the low pressure steam is condensed.

The liquid water thus formed is re-introduced into the boiler so that the process can be repeated. In the meantime the piston is returned to its starting position by some means such as flywheel or a second piston in opposition to it. In this type of heat engine heat losses are incurred in several ways such as: inefficient burning of fuel, inefficient heat transfer to the working substance and deliberate heat loss in the condenser where steam is converted to liquid water.

Figure 2:
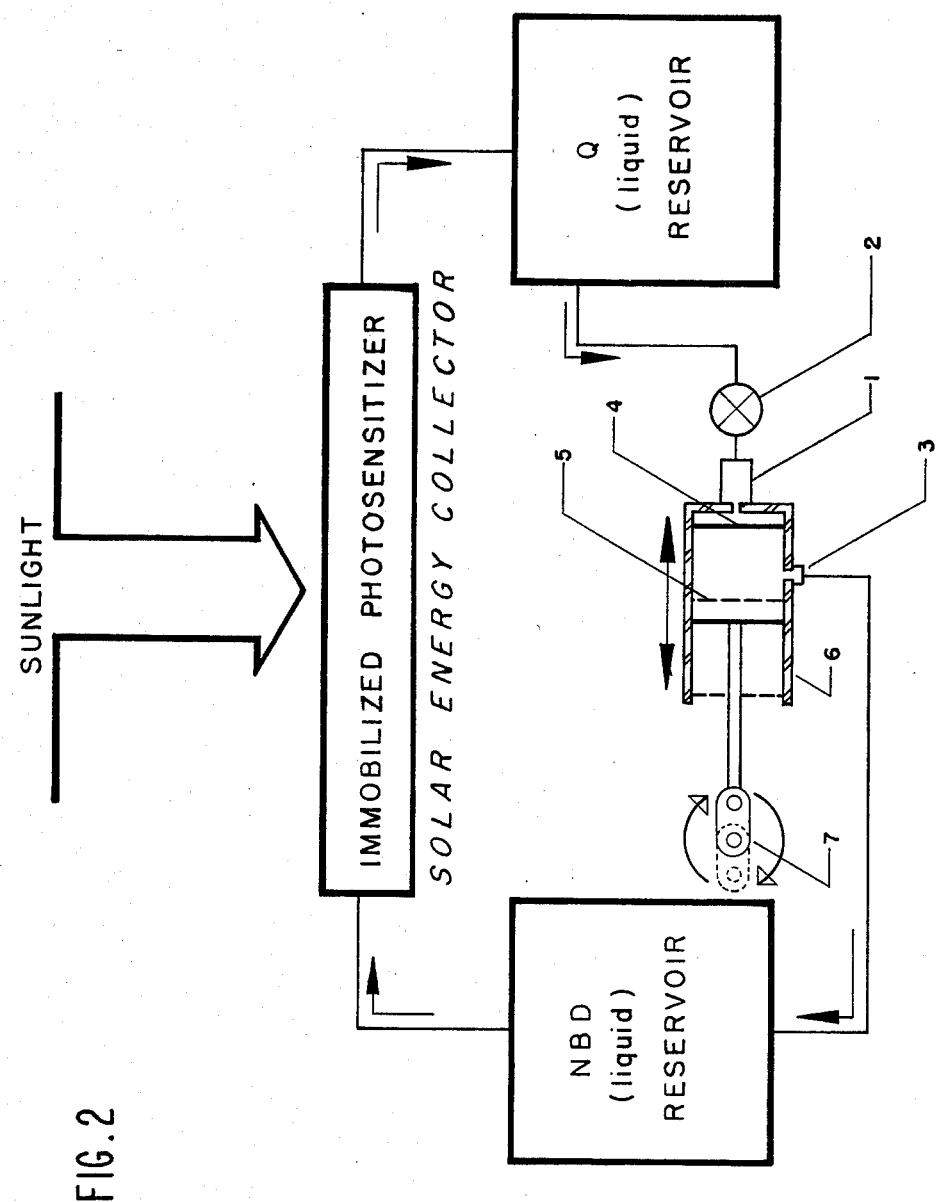
FIG. 2 is a schematic view of a piston arrangement disposed in the solar system.

The text of example 2 which follows is more readily understood by examining in detail the schematic structure shown in FIG. 2, with particular reference to the piston assembly therein. The piston assembly as shown in FIG. 2 includes a movable piston depicted in the compression position (4) and decompression position (5) within a stationary cylinder (6). Q passes from the Q reservoir through a check valve (2) which allows the flow of Q into the Q to NBD reversion catalyst chamber (1) but blocks passage of the pressurized NBD the values of any two of the thermodynamic state variables, pressure (P) temperature (T) and volume (V). For example a motor cannot be changed permanently by the energy conversion it performs; otherwise it would only be able to perform a finite amount of work.

For the closed cycle mentioned above using as an example an ideal gas heat engine with an ideal gas confined in a cylinder equipped with a frictionless piston and enclosed in a constant temperature bath, four steps are considered that completely describe the cycle. The thermodynamic quantities involved with each step is shown in the table 1.

Thus the net output of work in one complete cycle of the heat engine under discussion is $$w_{net} = q_h - E_2 - \frac{T_c}{T_h} q_h + E_2$$

$$= q_h \left( \frac{T_h - T_c}{T_h} \right);$$

and the net heat absorbed is

TABLE 1

| step #/description | Energy change | Work done | Heat absorbed |
|---|---|---|---|
| (1) reversible isothermal expansion at $T_{high}$ | $\Delta E_1 = 0$ | $W_1 = RT_h Ln\left(\frac{V1h}{V2h}\right)$ | $q_1 = RT_h Ln\left(\frac{V1h}{V2h}\right)$ |
| (2) reversible adiabatic (no heat flow) expansion $T_h \to T_c$ | $\Delta E_2 = \int_{T_h}^{T_c} C_v dT$ | $W_2 = -\Delta E_2$ | $q_2 = 0$ |
| (3) reversible isothermal compression at $T_c$ | $\Delta E_3 = 0$ | $W_3 = RT_c Ln\left(\frac{V2c}{V1c}\right)$ | $Q_3 = RT_c Ln\left(\frac{V2c}{V1c}\right)$ |
| (4) reversible adiabatic (No heat flow) compression $T_c \to T_h$ | $\Delta E_4 = \int_{T_c}^{T_n} C_v dT$ | $W_4 = -\Delta E_4 = \Delta E_2$ | $q_4 = 0$ |
| Total cycle | $\Delta E_{Total} = 0$ | $W_{Total} = W_1 + W_2 + W_3 + W_4$ | $q_{Total} = q_1 + q_2 + q_3 + q_4$ |

In the above table the variables are designated as follows:
$\Delta E$ = the change in internal energy of the ideal gas
W = Work
q = heat
$T_h$ = high temperature
$T_c$ = low temperature
$V_{1h}$ = larger volume at $T_h$
$V_{2h}$ = smaller volume at $T_h$:
$V_{1c}$ = larger volume at Ic
$V_{2c}$ = smaller volume at Ic
$V_{1c}$ is larger than $V_{1h}$
$V_{2c}$ is larger than $V_{2h}$: R = the gas constant
$C_v$ = the specific heat of the gas at constant volume Realizing that for a reversible adiabatic expansion of a non-polytropic gas starting at $V_1$ and $T_1$, the final volume $V_2$ and temperature $T_2$ are related as follows:

$$Ln\left(\frac{V_2}{V_1}\right) = \frac{1}{R} \int_{T_1}^{T_2} \frac{C_v}{T} dT$$

then it can be shown that $$W_3 = -\frac{T_c}{T_h} W_1 \text{ and}$$

$$q_3 = -\frac{T_c}{T_n} q_1 = \frac{T_c}{T_n} q_h$$

where $q_h$ is the heat absorbed from the heat thermal reservoir in the high temperature isothermal expansion.

$$q_{net} = q_h \left( \frac{T_h - T_c}{T_h} \right)$$

or the net work equals the net heat.

It might be thought that because of this equality that the heat to work conversion is carried out with 100% efficiency; however such a definition is without significance. However, by noting that an amount of heat, $q_h$, is absorbed during step 1 or the high temperature isothermal expansion, it is reasonable to write an expression for efficiency (e) as the ratio of the output to input or $$e = \frac{W}{q_h} = \frac{T_h - T_c}{T_h}$$

Thus if $T_h = 600°k$ and $T_c = 300°k$ then the maximum efficiency that could be expected would be 0.5.

If the ideal gas heat engine described above were run in reverse, it would define a heat pump. Work would be performed on the engine and the effect of this operation would be absorption of heat from the cold, reservoir and expulsion of heat to the hot reservoir; thus heat would be moved against a temperature gradient in a fashion analogous to that of an ordinary pump that moves a fluid against a pressure head.

If the ideal gas heat pump is used as a refrigerator it can be shown by argument similar to those above that the efficiency can be measured as the ratio vapor resulting therein back into the Q reservoir, thus confining the pressurized vapor to the space between the end of the cylinder (6) and the piston face (4). The piston under pressure is driven to the decompression position (5) causing a shaft (7) to turn, and because the work/heat has been extracted from the hot pressurized NBD vapor, the NBD is condensed to a liquid phase and flows from the exhaust port (3) back into the NBD reservoir.

EXAMPLE 2

With this in mind, Example 2 is considered where NBD-Q is the thermodynamic working substance and fuel.

(Herein the terminology "NBD and/or Q" is meant to denote the fact that either a mixture of NBD and Q or Q alone comprises the thermodynamic working substance—fuel). A simplified configuration of the heat engine in this case would require: the work substance, NBD and/or Q, a cylinder with movable piston, the catalyst bed, an NBD reservoir, an NBD and/or Q reservoir and miscellaneous hardware such as valving, fluid conductors and the like. In case 1 the thermodynamic working substance and fuel NBD and/or Q is introduced directly into the cylinder when the position of the piston in the cylinder is such that a relative minimum volume exists above the piston. The catalyst is immobilized inside the cylinder in the manner and by the chemical techniques already patented. The site within the cylinder at which the catalyst is chemically immobilized depends on the nature of the various surfaces within the cylinder. As mentioned above the preferred catalyst can be chemically bound to silicatious surfaces such as glass, silica, silica gel and the like, as well as oxidized aluminum and in some cases copper and copper oxide surfaces. Thus with surfaces such as those mentioned, being provided within the cylinder the catalyst can be chemically bound to it/them by the chemical immobilization techniques described in detail above. Otherwise stated, the surface within the cylinder to which the catalyst is to be chemically attached must be one that lends itself to or is suitable for chemical attachment of the catalyst. The specific surface within the cylinder to which the catalyst is attached would comprise the entire internal surface of the cylinder in an ideal case; however, such coverage can be lessened with little loss in performance. In either case however, the catalyst should be located within the cylinder so that the thermodynamic working substance—fuel makes good contact. For example if the thermodynamic working substance —fuel was introduced into the cylinder through the cylinder head or end the catalyst should be located on the surface of the cylinder at or near the point of entry that is the end or head of the cylinder. Similarly, a high surface area, porous, silicatious plug to which the catalyst is chemically bound can be located in the cylinder head or end and the thermodynamic working substance—fuel introduced into the cylinder through the plug.

The conversion of Q to NBD occurs in the cylinder causing a sudden change in internal pressure (due to the liquid-to-gas phase change) causing the piston to move so that the internal pressure is decreased. When the piston has moved far enough so that a relative maximum volume exists above the piston, the Q and/or NBD vapor is vented to the NBD reservoir.

The NBD can then be passed through the solar collector thus forming more Q and the cycle can be repeated on a continuous basis. The solar collector mentioned is that described in detail in another patent application. The Q thus formed is either re-cycled through the solar collector so that the relative concentration of Q is increased or it is deposited directly in the NBD and/or Q reservoir from which the thermodynamic working substance-fuel is drawn for the heat engine.

Figure 3:
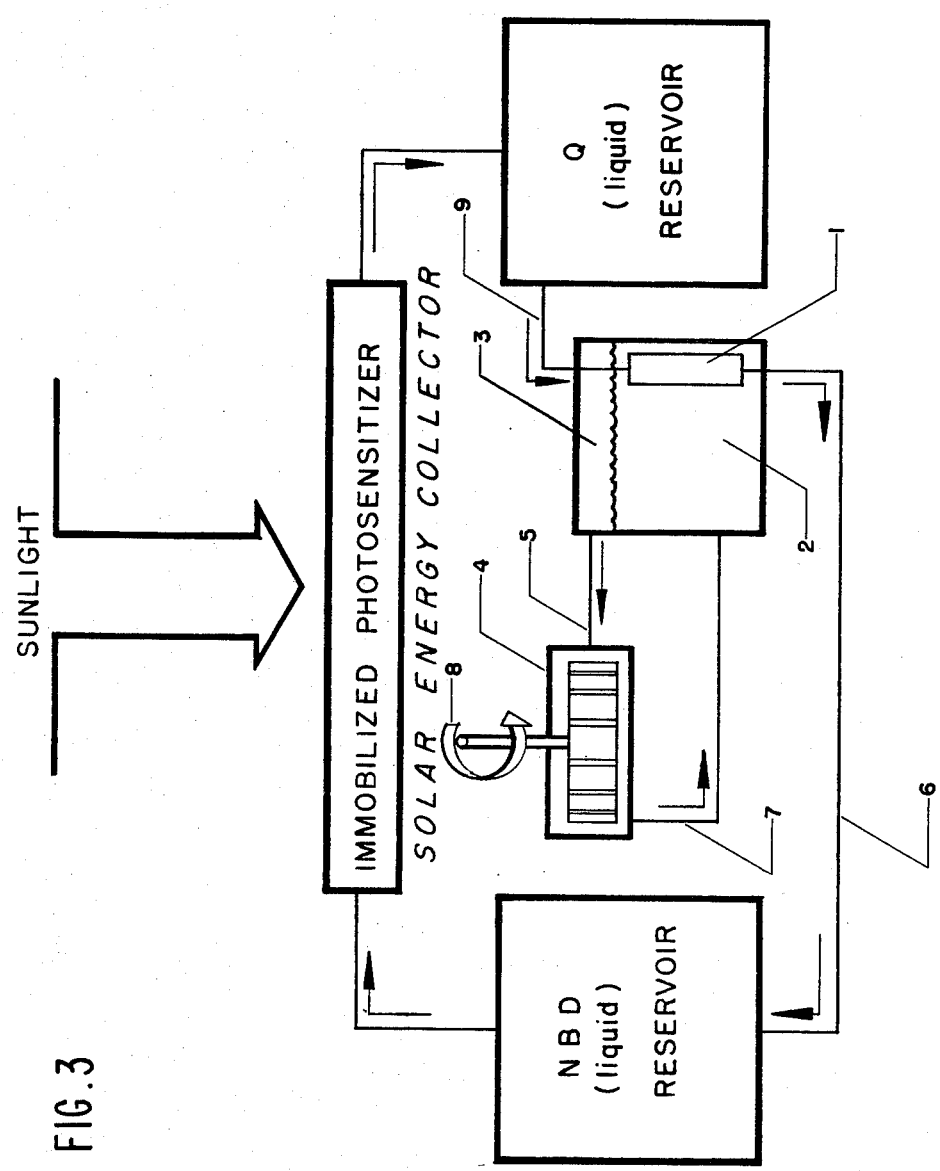
FIG. 3 is a schematic view showing a turbine assembly disposed in the solar system of the invention.

Examples 3 and 4 which follow can be more readily understood by referring to FIG. 3 in detail, and particularly to the turbine assembly depicted therein. The turbine assembly stator (4) receives the vapor of the thermodynamic working substance under pressure, such as those listed in Table 2, from the ulage (3) of the thermodynamic working substance reservoir by way of conduit (5). The heat necessary to vaporize and pressurize the thermodynamic working substance from its liquid phase (2) to its vapor phase under pressure in the ulage of the thermodynamic working substance reservoir (3) is supplied by the passage of Q from the Q reservoir through conduit (9) into the Q to NBD conversion catalyst chamber (1) with heat liberated into the liquid phase of the thermodynamic working substance (2) and the resultant NBD conducted by means of conduit (6) to the NBD reservoir. The extraction of work/heat from the thermodynamic working substance pressurized vapor results in the rotation of the turbine rotor (8), thus providing shaft work, and causes the condensation of the thermodynamic working substance which is conducted back to the thermodynamic working substance reservoir by conduit (7).

EXAMPLE 3

Example 3 differs from example 2 only in the following respects: the thermodynamic work substance is a substance other than NBD and/or Q and NBD and/or Q is used as a fuel only to heat the working substance by the catalytic release of heat from Q with the heat thus derived transmitted through a suitable heat exchanger to the thermodynamic working substance. The thermodynamic working substance then acts in a manner similar to that described for a simple steam engine. Such thermodynamic working substances are listed in Table 2.

EXAMPLE 4

The liquid-to-gas phase change of Q and/or NBD by catalytically converting Q to NBD can be made to drive a turbine, another example of a heat engine. By passing the high pressure and high temperature NBD and/or Q vapor through a suitable jet or nozzle, a high velocity stream of vapor can be directed on to the blades of a turbine causing rotary motion of turbine fan.

TABLE 2

Candidate Thermodynamic Working Substances, Refrigerants and Flame Retardents

| | | Bp |
|---|---|---|
| (1) | trichloro fluoromethane (Freon 11) | 25° C. |
| (2) | dichlorodifluoromethane (Freon 12) | −29° C. |
| (3) | chlorodifluoromethane (Freon 22) | 41° C. |
| (4) | Bromotrifluoromethane | — |
| (5) | dibromodifluoromethane | — |
| (6) | 1,1,2-trichloro-1,1,2-trifluoro ethane (Freon 113) | 48° |
| (7) | 1,2-dichloro-1,1,2,2-tetrafluorothane (Freon 114) | 3.8° |

TABLE 2-continued

| | Candidate Thermodynamic Working Substances, Refrigerants and Flame Retardents | |
|---|---|---|
| | | Bp |
| (8) | 1,1-difluoroethane (Genetron-100) | −25° |
| (9) | 1-chloro-1,1-difluoroethane (Genetron-101) | −10° |

The method in its simplest form used to accomplish this end is as follows: Q is pumped from the Q reservoir through a check valve to the nozzle. The orientation of the check valve is such that Q can only flow in the direction of the nozzle; that is if a pressure greater than that produced by the pump develops in the nozzle or vicinity of the nozzle, the fluid could not be forced thereby toward the reservoir through the pump. The catalyst used to affect the catalytic conversion of Q to NBD is located in or near the nozzle tip, for example by attaching or fixing in a suitable manner a porous siliceous or porous plug of other suitable material, upon which the catalyst is immobilized by the chemical means described in another patent application in the nozzle so that the fluid Q is forced through it, high local pressures are developed due to the phase change that occurs when Q is catalytically converted to NBD. Under these conditions a high velocity stream of NBD vapor is developed in the nozzle tip in a direction away from the tip. The high velocity stream of vapor thus formed is directed into the blades of the turbine fan where the kinetic energy of the high velocity stream of vapor is transferred to the fan as rotational motion. Obviously a multiplicity of such nozzle-check valve-catalyst plug assemblies could be placed around the fan of the turbine so that a greater total amount of kinetic energy per unit time is delivered at the fan blade site and thereby create rotary motion of broader application. The fate of the vapor after it loses its kinetic energy to the fan blade of the turbine is that of reduced temperature and condensation after which it is conducted by piping or fluid conductors to the NBD reservoir. As was the case in the previous examples, Q may then be formed by passing the NBD through the solar collector and the cycle repeated. By sizing the means of producing Q properly with respect to the demand for Q, continuous operation of the turbine can be brought about. It is worth noting that because NBD has 5 times the molecular mass of water, for a given mass of NBD, 5 times the kinetic energy delivered by an equal mass of water will occur if NBD is the thermodynamic working substance instead of water steam.

In the theoretical discussion presented above, the operation of a heat pump was discussed with examples given. It was stated that a heat pump can be regarded as a heat engine run in reverse, that is heat is removed from a cold reservoir and transferred to a hot reservoir by the expenditure of work. The refrigeration units found in air conditioners, freezers, refrigerators and the like are examples of heat pump applications. Because Q and/or NBD can be utilized to perform work, as was described in the context of a heat engine as the thermodynamic working substance-fuel it can also be used as the thermodynamic working substance-fuel in a heat pump and therefore refrigeration applications are possible. Several examples are considered and listed below: (5) NBD and/or Q as the thermodynamic working substance-fuel otherwise known as the refrigerant; (6) a mixture of NBD and/or Q and a common refrigerant such as fluorinated hydrocarbons as shown in Table 2; and (7) Q is employed as a fuel only and as such the source of heat used to cause a liquid-to-gas phase change in a common refrigerant such as fluorinated hydrocarbons, as shown in Table 2 by means of a heat exchanger, that is Q is not mixed with the refrigerant. Or Q is used to drive a heat engine as described above which in turn supplies the mechanical energy to drive the compressor of any type of refrigeration unit.

In order to properly orient these examples of the NBD-Q driven heat pumps, it is necessary to make a few preliminary comments regarding the sordinary operation of a heat pump and in particular a refrigeration unit (which is a heat pump). Because of the fact that the thermodynamic working substance is also the fuel, a unique sort of heat pump is possible. The cycle generally followed by a heat pump used as a refrigeration unit (in its simplest form) is as follows: the thermodynamic working substance is caused to undergo liquid-to-gas phase change and the gaseous phase after being compressed and cooled, is expanded into a heat exchanger with the accompanying reduction in temperature in the heat exchanger, where condensation (gas-to-liquid phase change) of the thermodynamic working substance (refrigerant) or super cooling of the thermodynamic working substance vapor or some combination thereof occurs. When the temperature of and in the heat exchanger falls below the temperature of the fluid (air, other gas or liquid) to be cooled, heat flows from the fluid to be cooled and its temperature is reduced or cooling occurs. The condensed thermodynamic working substance and/or its vapor is thus warmed and passes from the heat exchanger (sometimes called the condenser) into the part of the heat pump where it is re-heated until a liquid-to-gas phase change occurs and the cycle can be repeated. Ordinarily the cycle can be repeated on a continuous basis so that cooling can be continuous.

EXAMPLE 5

In this example Q and/or NBD is the thermodynamic working substance-fuel and refrigerant and is utilized in the following manner. Q is placed in contact with the catalyst so that a liquid-to-gas phase change occurs in a vessel that is constructed so that the heat of vaporization can be drawn off or in some way removed to be discarded or otherwise used for some useful purpose. When the temperature of the NBD vapor has dropped to near its boiling point, the vapor is then expanded into a larger vessel known as a heat exchanger and is the site of the desired refrigeration. Expansion into the heat exchanger results in rapid cooling, even supercooling, with the heat exchanger becoming much colder than the fluid to be cooled. As this fluid passed across the heat exchanger it loses heat to the heat exchanger, and is therefore cooled while at the same time the NBD vapor is warmed. The warmed condensed NBD is then conducted to the NBD reservoir and from there can be passed through the solar collector so that more Q can be formed and the cycle repeated; thereby refrigeration is carried out on a continuous basis if desired. Storage of Q with controlled or periodic utilization is clearly possible and desirable in many cases.

EXAMPLE 6

In this example a common refrigerant is mixed with NBD-Q such as fluorinated hydrocarbons, shown in Table 2. The operation of the heat pump would be exactly the same in principal as described in the previous example; however, certain performance can be controlled and the fire hazard associated with NBD-Q is thereby either vastly reduced or eliminated. The performance of any refrigeration unit or heat pump depends on the heat of vaporization of the refrigerant regardless of its chemical nature. Likewise the temperature at which vaporization occurs defines the cooling capacity and thus imposes some engineering restrictions on the physical size of the various components that comprise the heat pump and ancillary apparatus. Thus by forming a well specified mixture of NBD-Q and other refrigerant the heat of vaporization and the temperature at which vaporization of the mixture occurs can be adjusted as necessary to satisfy engineering constraints on the designs of a specific heat pump.

EXAMPLE 7

In this example Q is employed as a fuel and as such only as a source of heat used to cause a liquid-to-gas phase change in a common type refrigerant such as fluorinated hydrocarbons as shown in Table 2. In this example the refrigerant and NBD-Q are not mixed but rather separated either by a suitable heat exchanger or a heat engine used to drive a typical compressor pump. In the latter configuration the compressor of any type of refrigeration unit would be driven or have its mechanical energy supplied by a heat engine as described above using Q and/or NBD as the thermodynamic working substance-fuel. In the former case however, Q is brought in contact with the catalyst to form NBD and heat. By means of a suitable heat exchanger, the heat thus generated would be transmitted to a common type of refrigerant such as fluorinated hydrocarbons (as shown in Table 2) causing a liquid-to-gas phase change of the refrigerant. The subsequent operation of the refrigeration unit would follow the steps outlined in the first example of heat pump applications. Thus in this manner solar energy stored in Q can be used to drive a heat pump for whatever reason.

It is proposed that certain inert flame resistant and retardant types of organic liquids be added to NBD-Q so that the fire hazard of NBD-Q be substantially reduced or eliminated. Organic liquids such as fluorinated hydrocarbons are useful in this regard; however, certain chlorinated hydrocarbons are also useful. The fluorinated hydrocarbons are preferred in this regard however, due to their relative inertness or low reactivity with respect to the chemical components of the solar energy storage and retrieval system that depends on NBD & Q. The use of nitrogen gas as a sparge as well as a displacement gas for oxygen reduces the fire hazard substantially; however, the use of nitrogen gas along with certain fluorinated hydrocarbons reduces further the overall flammability of the system while not appreciably affecting the overall performance of the system, and in fact enhancing the system performance as described above. Table 2 lists the preferred flame retardants.

According to Farrington Daniels in "Direct Use of the Sun's Energy" if overall electricity production efficiency of about 0.1 could be achieved by using a heat engine such as those described, the economics of producing electricity in this manner would be favorable. It is calculated that the upper limit of efficiency for the NBD-Q system for use on driving a heat engine as described above is 0.35 and could be greater in terms of conventional fuel because of the minimization of heat losses, due to the fact that NBD and/or Q remains unchanged chemically by the closed cycle of use described for its use as a thermodynamic working substance and fuel. We have measured conversion efficiencies of 0.3 already.

It has been repeatedly mentioned in the foregoing that NBD and/or Q was a fuel. Reference has also been made to the ability of NBD-Q (the mixture) to act as the thermodynamic working substance and fuel when used in conjunction with a heat engine and/or a heat pump; and in this context NBD-Q has also been referred to as a refrigerant. Thus, either a mixture of NBD and Q, or Q alone can act in a multiplicity of roles simultaneously that is as a fuel, as a thermodynamic working substance, and as a refrigerant. Because no other substance can act in such a multifaceted manner, this substance (NBD-Q) is regarded as truly unique.

Accordingly, I intend to be limited only by the following patent claims:

I claim:

1. The process of operating an engine, motor or the like, which comprises heating the work substance therein with a chemical energy-producing substance containing quadricyclene, by causing the catalytic release of heat from quadricyclene, passing said heat through a heat exchanger to said working substance to elevate the temperature of the same, causing said work substance to operate said engine.

2. The process of claim 1 wherein the work substance is steam and the engine is a steam engine.

* * * * *